United States Patent
Yi et al.

(10) Patent No.: US 8,303,178 B2
(45) Date of Patent: Nov. 6, 2012

(54) TEMPERATURE DETECTING DEVICE AND METHOD

(75) Inventors: Bin-Wei Yi, Taichung (TW); Hui-Yi Cheng, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 354 days.

(21) Appl. No.: 12/855,836

(22) Filed: Aug. 13, 2010

(65) Prior Publication Data
US 2011/0038396 A1 Feb. 17, 2011

(30) Foreign Application Priority Data
Aug. 14, 2009 (TW) .............................. 98127442 A

(51) Int. Cl.
*G01K 7/16* (2006.01)
*G01K 3/00* (2006.01)
(52) U.S. Cl. ................... 374/171; 374/E7.018; 702/130
(58) Field of Classification Search .................. 374/170, 374/171, 183, E7.018, E7.036; 702/130
See application file for complete search history.

(56) References Cited

U.S. PATENT DOCUMENTS

| | | | |
|---|---|---|---|
| 4,213,125 A | 7/1980 | Watanabe | |
| 4,395,139 A | 7/1983 | Namiki et al. | |
| 5,351,013 A | 9/1994 | Alidio et al. | |
| 6,934,645 B2 | 8/2005 | Kim | |
| 7,113,881 B2 * | 9/2006 | Boerstler et al. | 702/117 |
| 7,171,327 B2 | 1/2007 | Kim | |
| 7,197,420 B2 * | 3/2007 | Johns et al. | 702/130 |
| 7,661,878 B1 * | 2/2010 | Lall et al. | 374/170 |
| 7,896,545 B2 * | 3/2011 | Pan | 374/178 |
| 8,049,527 B2 * | 11/2011 | Lee | 324/762.01 |
| 8,096,706 B2 * | 1/2012 | Lee | 374/170 |

* cited by examiner

*Primary Examiner* — R. A. Smith
(74) *Attorney, Agent, or Firm* — WPAT PC; Justin King

(57) ABSTRACT

A temperature detecting device includes a current source, a plurality of resistors, a binary counter, a multiplexer, a comparator and a control logic. The current source provides a PTAT current. The resistors provide m voltage signals with ascending or descending voltages. The binary counter generates a binary select signal having (n+1) bits. The m voltage signals are selectively outputted from the multiplexer as a multiplexer output signal according to the binary select signal, wherein $2^n < m < 2^{n+1}$. The comparator is used for comparing the multiplexer output signal with a reference voltage, thereby generating a comparing signal. The control logic is for issuing the start signal. If the comparing signal has a level change, the control logic controls the binary counter to record the binary select signal as a binary temperature signal. The reference voltage does not vary with temperature.

13 Claims, 13 Drawing Sheets

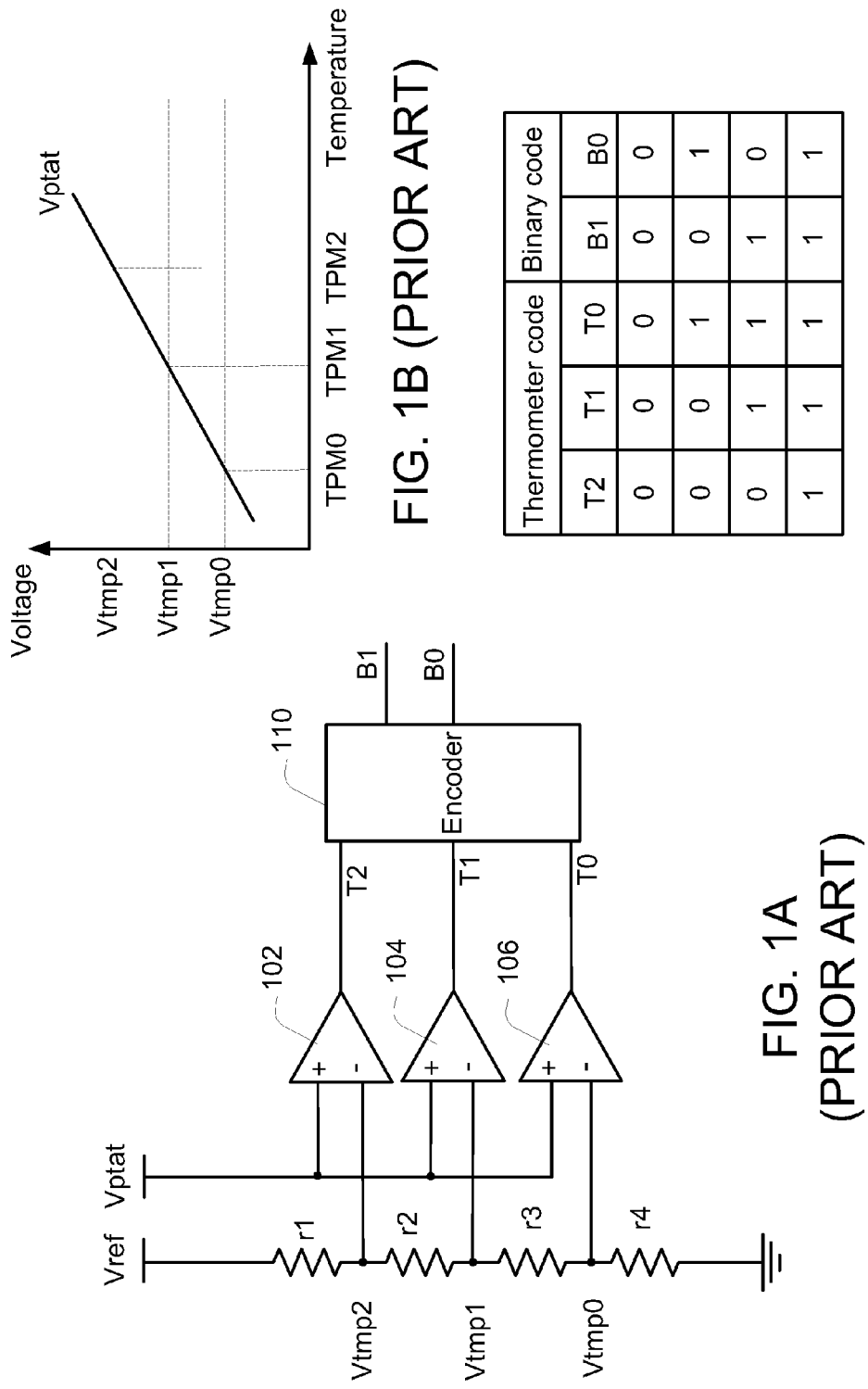

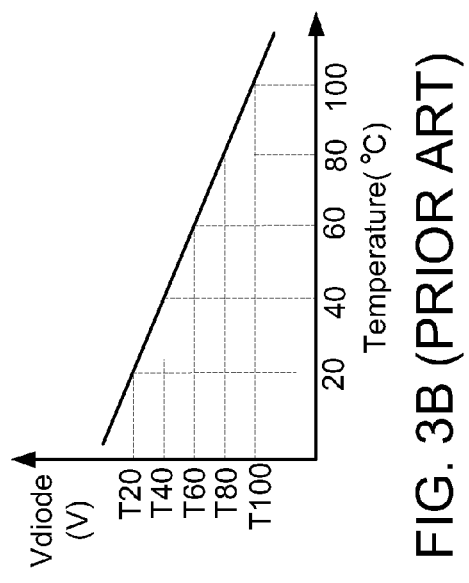
FIG. 3B (PRIOR ART)
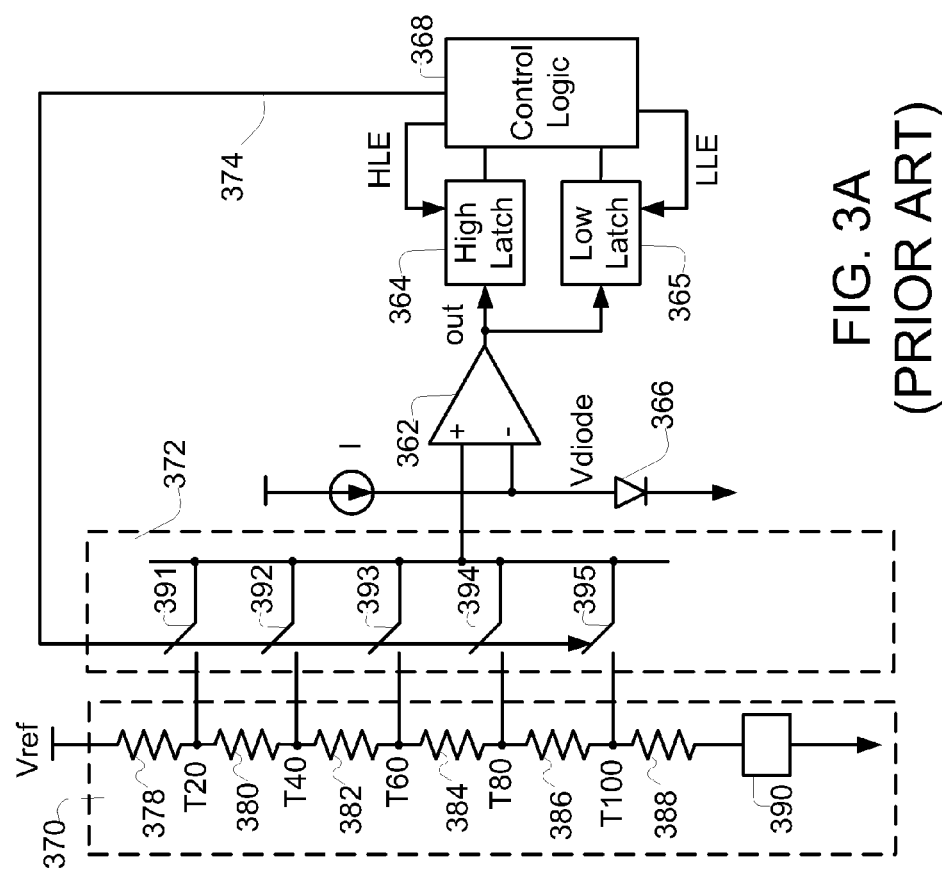
FIG. 3C (PRIOR ART)
FIG. 3A (PRIOR ART)

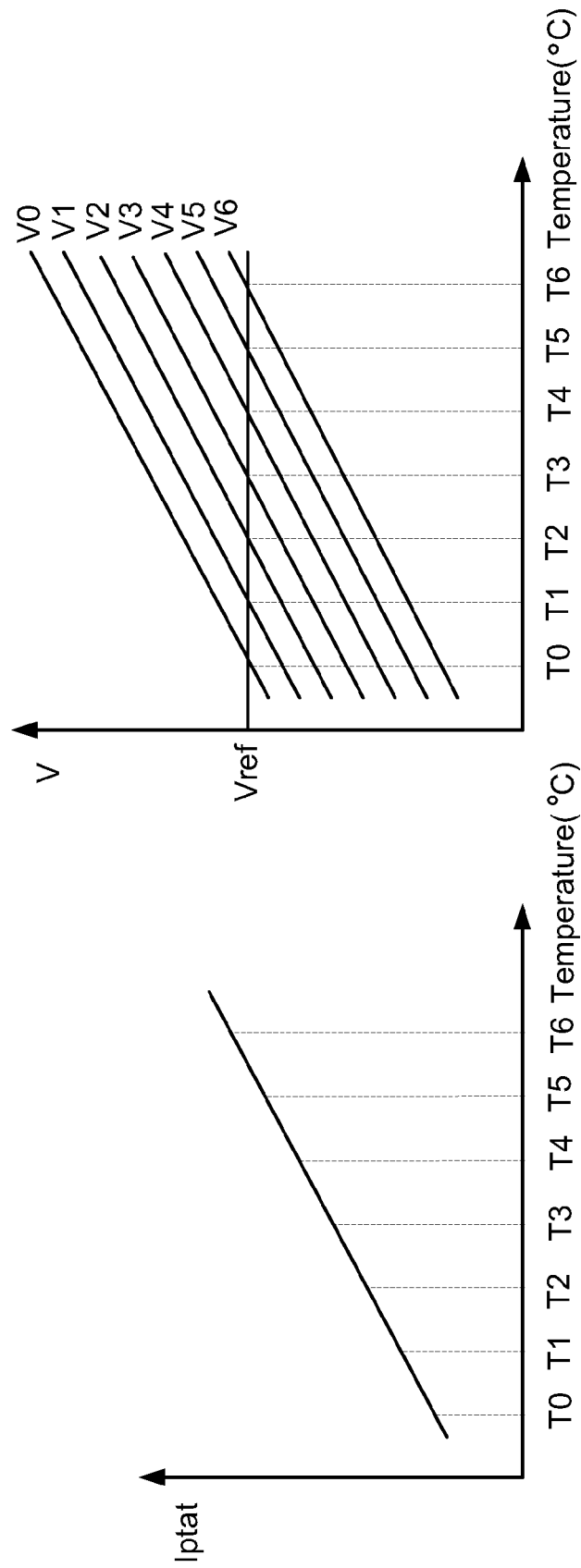

TEMPERATURE DETECTING DEVICE AND METHOD

FIELD OF THE INVENTION

The present invention relates to a temperature detecting device and a temperature detecting method, and more particularly to a temperature detecting device and a temperature detecting method for directly outputting a binary code.

BACKGROUND OF THE INVENTION

FIG. 1A is a schematic circuit diagram illustrating a temperature detecting device according to the prior art. As shown in FIG. 1A, four resistors r1, r2, r3 and r4 are serially connected between a reference voltage (Vref) and a ground terminal. The reference voltage (Vref) does not vary with temperature. The three nodes between these four resistors are respectively connected to negative input terminals of three comparators 102, 104 and 106 for providing three voltages Vtmp2, Vtmp1 and Vtmp0. The positive input terminals of the comparators 102, 104 and 106 are connected to a PTAT (proportional to absolute temperature) voltage Vptat. The PTAT voltage Vptat increases as the temperature rises. An encoder 110 is connected to the output terminals of the comparators 102, 104 and 106. By the encoder 110, a three-bit thermometer code is converted into a binary code (B1, B0).

FIG. 1B is a schematic diagram illustrating the relationship between the PTAT (proportional to absolute temperature) voltage and the temperature. In a case that the temperature is lower than TMP0, the PTAT voltage Vptat is lower than Vtmp0, and the three bits (T2, T1, T0) at the output terminals of the comparators 102, 104 and 106 are (0, 0, 0). In a case that the temperature ranges between TMP0 and TMP1, the PTAT voltage Vptat ranges between Vtmp0 and Vtmp1, and the three bits (T2, T1, T0) at the output terminals of the comparators 102, 104 and 106 are (0, 0, 1). In a case that the temperature ranges between TMP1 and TMP2, the PTAT voltage Vptat is ranged between Vtmp1 and Vtmp2, and the three bits (T2, T1, T0) at the output terminals of the comparators 102, 104 and 106 are (0, 1, 1). In a case that the temperature is higher than TMP2, the PTAT voltage Vptat is higher than Vtmp2, and the three bits (T2, T1, T0) at the output terminals of the comparators 102, 104 and 106 are (1, 1, 1).

In other words, the three bits T2, T1 and T0 at the output terminals of the comparators 102, 104 and 106 constitute a three-bit thermometer code. By the encoder 110, the three-bit thermometer code is converted into a binary code (B2, B1). FIG. 1C is a schematic diagram illustrating a conversion table of the encoder 110.

However, the temperature detecting device of FIG. 1A has too many comparators, which occupy much layout area of the chip and increase the fabricating cost of the chip. Moreover, the temperature detecting device of FIG. 1A needs an encoder for converting the three-bit thermometer code into a binary code.

FIG. 2A is a schematic circuit diagram illustrating a temperature detecting device having a single comparator according to the prior art. The temperature detecting device of FIG. 2A is disclosed in for example U.S. Pat. No. 4,213,125. As shown in FIG. 2A, five resistors R1, R2, R3, R4 and R5 are serially connected between a power source voltage V and a ground terminal. The power source voltage V does not vary with temperature. The four nodes between these five resistors provide four voltages V1, V2, V3 and V4, respectively. These four voltages V1, V2, V3 and V4 are respectively inputted into the first terminals of switches (SW) 215, 216, 217 and 218. The second terminals of the switches 215, 216, 217 and 218 are all connected to a positive input terminal of a comparator 214.

A resistor R and a thermistor TH are interconnected between the power source voltage V and the ground terminal in series. A node between the resistor R and the thermistor TH provides a voltage V10, which is inputted into a negative input terminal of the comparator 214.

Two inverters 201, 202, a resistor 203 and a capacitor 204 constitute an oscillation circuit to generate an oscillation signal φ. The oscillation signal φ is inputted into first input terminals of four AND gates 206, 207, 208 and 209. In addition, after the oscillation signal φ is received by a counter 205, the counter 205 outputs a first signal φ1, a second signal φ2, a third signal φ3 and a fourth signal φ4. The first signal φ1, the second signal φ2, the third signal φ3 and the fourth signal φ4 are respectively inputted into second input terminals of the AND gates 206, 207, 208 and 209, and respectively inputted into the control terminals of the switches (SW) 215, 216, 217 and 218.

The input terminals of the latches 210, 211, 212 and 213 are connected to the output terminal of the comparator 214. The control terminals of the latches 210, 211, 212 and 213 are respectively connected to the output terminals of the AND gates 206, 207, 208 and 209.

FIG. 2B is a schematic timing waveform diagram illustrating the relationships between the oscillation signal φ, the first signal φ1, the second signal φ2, the third signal φ3 and the fourth signal φ4 processed by the temperature detecting device of FIG. 2A. The latches 210, 211, 212 and 213 generate output signals OUT11, OUT12, OUT13 and OUT14, respectively. In addition, the output signals OUT11, OUT12, OUT13 and OUT14 are renewed every detecting cycle τ.

Due to the characteristics of the thermistor TH, the resistance of the thermistor TH increases with increasing temperature. That is, the higher the temperature is, the lower the voltage V10 is. During every detecting cycle τ, the voltage V10 is sequentially compared with the voltages V1, V2, V3 and V4, and the comparing results are respectively stored in the latches 210, 211, 212 and 213. In this situation, the output signals OUT11, OUT12, OUT13 and OUT14 of the latches 210, 211, 212 and 213 are the output signals of the temperature detecting device.

As the temperature gradually increases from low to high, the output signals OUT11, OUT12, OUT13 and OUT14 of the latches 210, 211, 212 and 213 are sequentially changed from "0000" to "0001", "0011", "0111", "1111". Since the output signals constitute a four-bit thermometer code, an additional encoder is necessary to convert the thermometer code into a binary code.

FIG. 3A is a schematic circuit diagram illustrating another temperature detecting device having a single comparator according to the prior art. The temperature detecting device of FIG. 3A is disclosed in for example U.S. Pat. No. 7,171,327. A temperature reference network 370 comprises six resistors 378, 380, 382, 384, 386, 388, and a trimmer 390, which are interconnected between a reference voltage (Vref) and a ground terminal is series. The five nodes between these six resistors 378, 380, 382, 384, 386 and 388 provide five signals T20, T40, T60, T80 and T100, respectively. The signals T20, T40, T60, T80 and T100 may be properly adjusted by the trimmer 390.

A switch network 372 comprises five switches 391, 392, 393, 394 and 395. Control signals are transmitted to the switches 391, 392, 393, 394 and 395 through a switch control line 374. In response to the control signals, the signals T20, T40, T60, T80 and T100 are selectively inputted into a positive input terminal of a comparator 362. A current source I provides a current to a sense diode 366 to generate a diode voltage Vdiode. The diode voltage Vdiode is received by the negative input terminal of the comparator 362.

The control logic 368 produces a plurality of control signals. The control signals are sent to the switch network 372 through the switch control line 374 to sequentially close two adjacent switches (e.g. the switch pairs 395 and 394, 394 and 393, 393 and 392, or 392 and 391). Moreover, the high latch enable (HLE) control signal and the low latch enable (LLE) control signal sequentially control the latching of a high latch 364 and a low latch 365. According to the output signals of the high latch 364 and the low latch 365, the temperature range is realized by the control logic 368.

FIG. 3B is a schematic diagram illustrating the relationship between the diode voltage Vdiode and the temperature. As shown in FIG. 3B, the diode voltage Vdiode decreases with increasing temperature.

FIG. 3C is a schematic timing waveform diagram illustrating the control signals S1, S2, S3, S4 and S5, the HLE control signal and the LLE control signal processed by the temperature detecting device of FIG. 3A. In a case that the temperature ranges between 100 degrees (in Celsius) and 80 degrees, the control signal S1 is sent to the switch network 372 through the switch control line 374 to close the switch 395, so that the signal T100 and the diode voltage Vdiode are inputted into the comparator 362. The comparing result of the comparator 362 is stored in the high latch 364. Sequentially, the control signal S2 is sent to the switch network 372 through the switch control line 374 to close the switch 394, so that the signal T80 and the diode voltage Vdiode are inputted into the comparator 362. The comparing result of the comparator 362 is stored in the low latch 365. If the level states of the high latch 364 and the low latch 365 are respectively "0" and "1", it is determined that the temperature ranges between 100 degrees and 80 degrees. Whereas, if the level states of the high latch 364 and the low latch 365 are respectively "0" and "0", it is determined that the temperature is lower than 80 degrees. Whereas, if the level states of the high latch 364 and the low latch 365 are respectively "1" and "1", it is determined that the temperature is higher than 100 degrees.

Similarly, for any temperature range, the control logic 368 may produce two corresponding control signals S1~S5 to control two adjacent switches. If the level states of the high latch 364 and the low latch 365 are respectively "0" and "1", it is determined that the temperature ranges within the corresponding temperature range. On the other hand, if the level states of the high latch 364 and the low latch 365 are not respectively "0" and "1", the similar process should be done for another temperature range.

Generally, the temperature signal used in a digital circuit should be binary temperature signal. Since the conventional temperature detecting device fails to directly output the binary temperature signal, an additional encoder is necessary to convert the thermometer code into a binary code.

Therefore, there is a need of providing a temperature detecting device and a temperature detecting method for directly outputting a binary code in order to obviate the drawbacks encountered from the prior art.

SUMMARY OF THE INVENTION

The present invention provides a temperature detecting device and a temperature detecting method for directly outputting a binary code, in which the binary code is used as a temperature parameter to be used in the digital circuit.

In accordance with an aspect of the present invention, there is provided a temperature detecting device. The temperature detecting device includes a current source, a plurality of resistors, a binary counter, a multiplexer, a comparator and a control logic. The current source provides a proportional to absolute temperature (PTAT) current. The resistors connected between the current source and a ground terminal in series for providing m voltage signals with ascending or descending voltages. The binary counter is used for counting in response to a start signal, thereby generating a binary select signal. The binary select signal is a (n+1)-bit select signal. The multiplexer has m input terminals for respectively receiving the m voltage signals. One of the m voltage signals is selectively outputted from the multiplexer as a multiplexer output signal according to the binary select signal, wherein $2^n < m < 2^{n+1}$. The comparator is used for comparing the multiplexer output signal with a reference voltage, thereby generating a comparing signal. The control logic is for issuing the start signal. If the comparing signal has a level change, the control logic controls the binary counter to record the binary select signal as a binary temperature signal. The reference voltage does not vary with temperature.

In accordance with another aspect of the present invention, there is provided a temperature detecting method. Firstly, a proportional to absolute temperature (PTAT) current flows through a plurality of serially connected resistors, thereby sequentially generating m voltages signals with ascending or descending voltages. Sequentially, the m voltage signals are inputted into a comparator during a detecting cycle, and the m voltage signals are compared with a reference voltage that does not vary with temperature, thereby generating a comparing signal. If the comparing signals corresponding to the first (k−1) voltage signals of the m voltage signals are all at a first level state but the comparing signal corresponding to the kth voltage signal of the m voltage signals is switched from the first level state to a second level state, a specified temperature is determined according to the value k.

BRIEF DESCRIPTION OF THE DRAWINGS

The above contents of the present invention will become more readily apparent to those ordinarily skilled in the art after reviewing the following detailed description and accompanying drawings, in which:

FIG. 1A is a schematic circuit diagram illustrating a temperature detecting device according to the prior art;

FIG. 1B is a schematic diagram illustrating the relationship between the PTAT (proportional to absolute temperature) voltage and the temperature in the temperature detecting device of FIG. 1A;

FIG. 1C is a schematic diagram illustrating a conversion table of an encoder in the temperature detecting device of FIG. 1A;

FIG. 3A is a schematic circuit diagram illustrating another temperature detecting device having a single comparator according to the prior art;

FIG. 3B is a schematic diagram illustrating the relationship between the diode voltage Vdiode and the temperature in the temperature detecting device of FIG. 3A;

FIG. 3C is a schematic timing waveform diagram illustrating the control signals S1, S2, S3, S4 and S5, the HLE control signal and the LLE control signal processed by the temperature detecting device of FIG. 3A;

FIG. 6A is a schematic diagram illustrating the relationship between the PTAT (proportional to absolute temperature) current and the temperature in the temperature detecting device of FIG. 5;

FIG. 6B is a schematic diagram illustrating the relationship between the seven voltage signals, the reference voltage and the temperature in the temperature detecting device of FIG. 5;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2B:
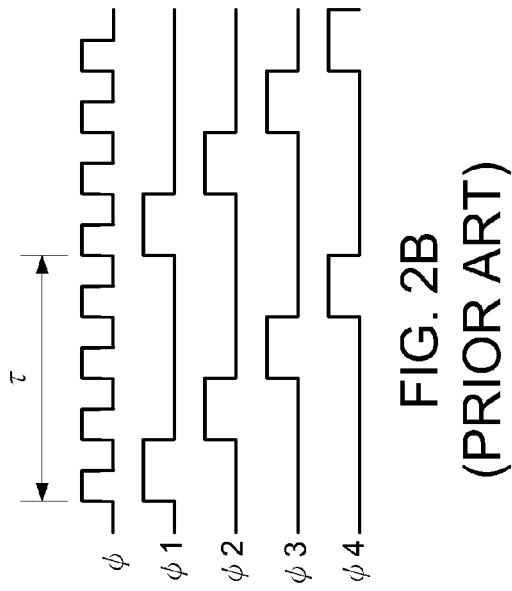
FIG. 2B is a schematic timing waveform diagram illustrating the relationships between the oscillation signal φ, the first signal φ1, the second signal φ2, the third signal φ3 and the fourth signal φ4 processed by the temperature detecting device of FIG. 2A.
Figure 2A:
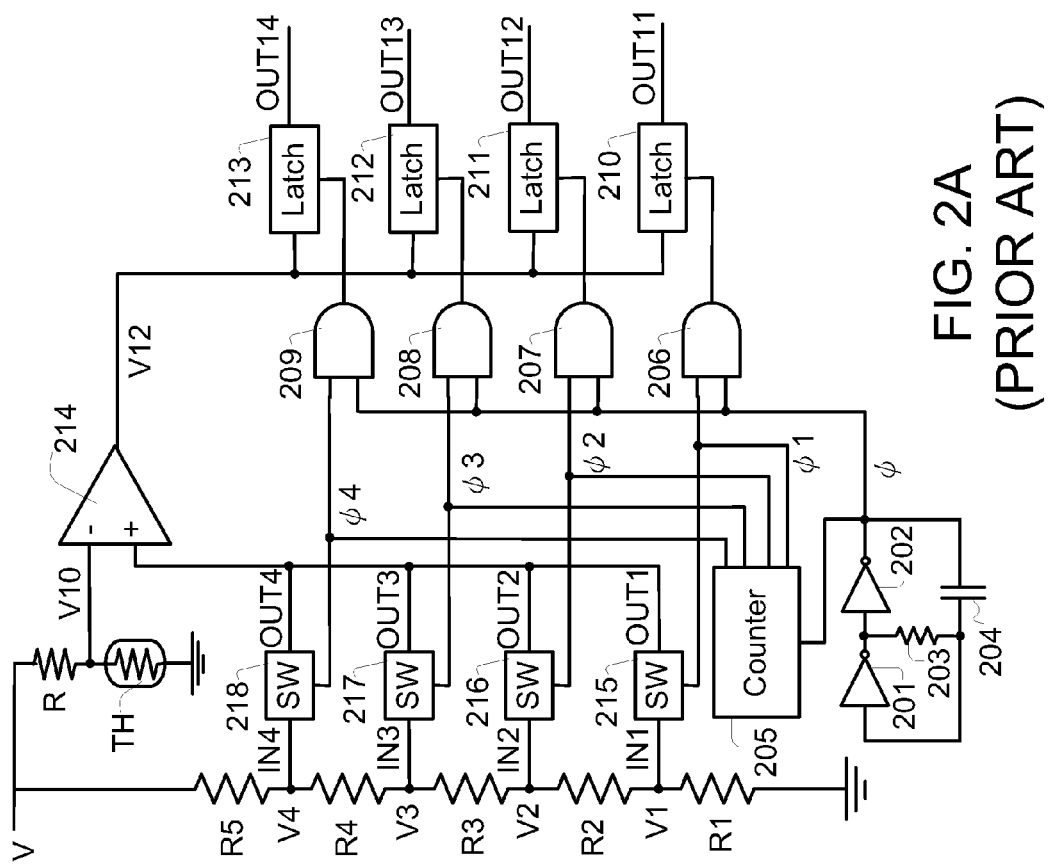
FIG. 2A is a schematic circuit diagram illustrating a temperature detecting device having a single comparator according to the prior art.
Figure 4:
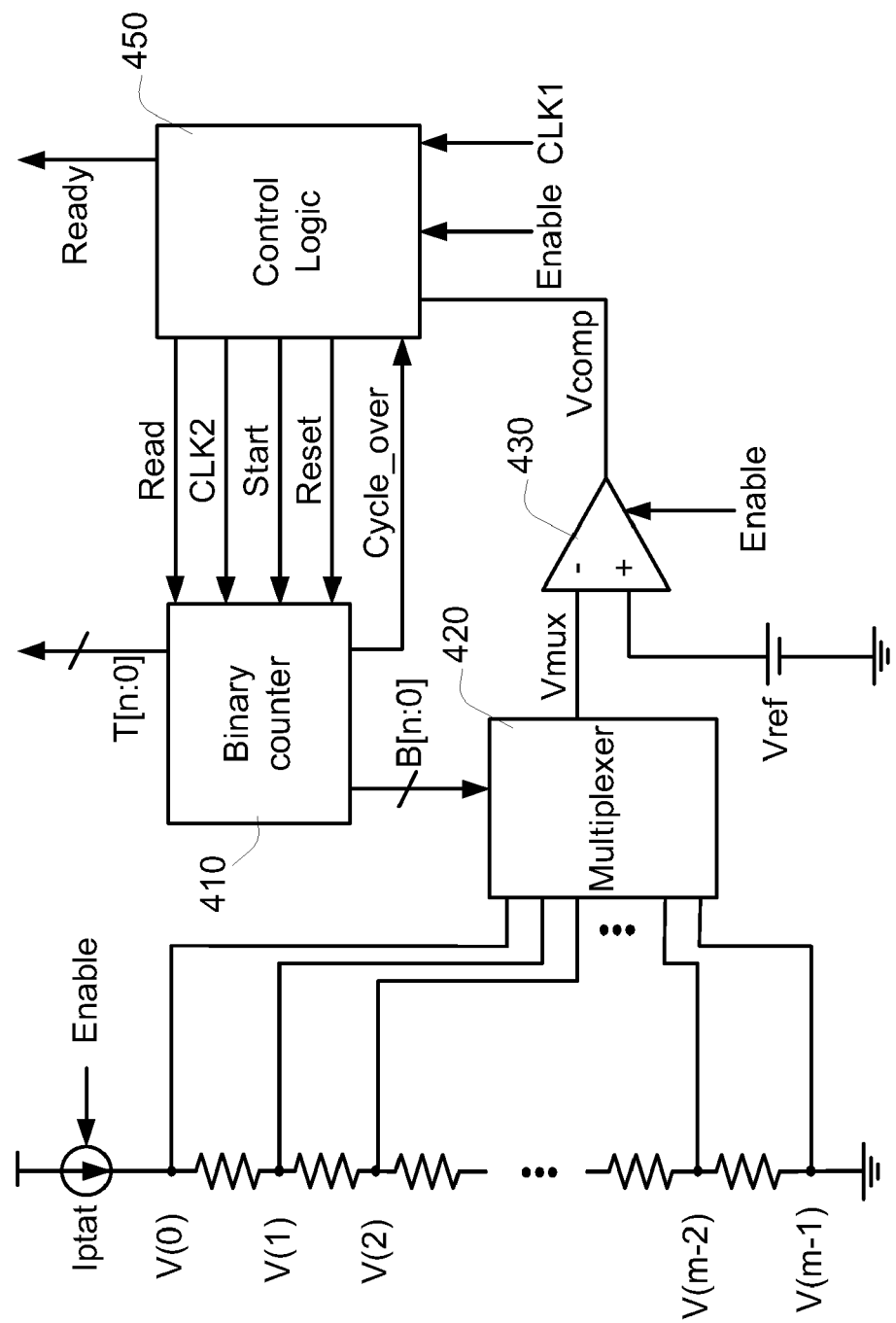
FIG. 4 is a schematic circuit diagram illustrating a temperature detecting device according to an embodiment of the present invention.

FIG. 4 is a schematic circuit diagram illustrating a temperature detecting device according to an embodiment of the present invention. As shown in FIG. 4, the temperature detecting device comprises a plurality of resistors. These resistors are interconnected between a current source and a ground terminal in series. The current source outputs a PTAT (proportional to absolute temperature) current Iptat. The m nodes between these resistors respectively provide m voltage signals V0, V1, . . . , V(m−2) and V(m−1) to a multiplexer 420.

In each detecting cycle, a binary counter 410 counts from 0 to m, and produces a (n+1)-bit binary select signal B [n:0] to the multiplexer 420. In response to the binary select signal B [n:0], one of the m voltage signals is outputted from the multiplexer 420 as a multiplexer output signal (Vmux). The multiplexer output signal (Vmux) is transmitted to a negative input terminal of a comparator 430. A reference voltage (Vref) is inputted into a positive input terminal of the comparator 430. The reference voltage (Vref) does not vary with temperature. The multiplexer output signal (Vmux) is compared with the reference voltage (Vref), and thus a comparing signal (Vcomp) is outputted from the comparator 430 to the control logic 450.

If the comparing signal (Vcomp) has a level change, the control logic 450 controls the binary counter 410 to latch the current binary select signal B [n:0] as a counting value. After the detecting cycle is completed, the counting value is outputted as a (n+1)-bit binary temperature signal. In other words, the binary temperature signal is the counting value that is latched by the binary counter 410, wherein $2^n < m < 2^{n+1}$.

In this embodiment, the binary counter 410 is an up counter for sequentially counting from 0 to m. The magnitudes of the m voltage signals V0, V1, . . . , V(m−2) and V(m−1) have a descending order. It is noted that, however, those skilled in the art will readily observe that numerous modifications and alterations may be made while retaining the teachings of the invention. For example, the binary counter 410 may be a down counter for sequentially counting from m to 0; the m voltage signals have an ascending order; or the signal inputted into the positive input terminal and the signal inputted into the negative input terminal are exchanged. Hereinafter, the present invention will be illustrated by setting the values m=7 and n=2.

Figure 5:
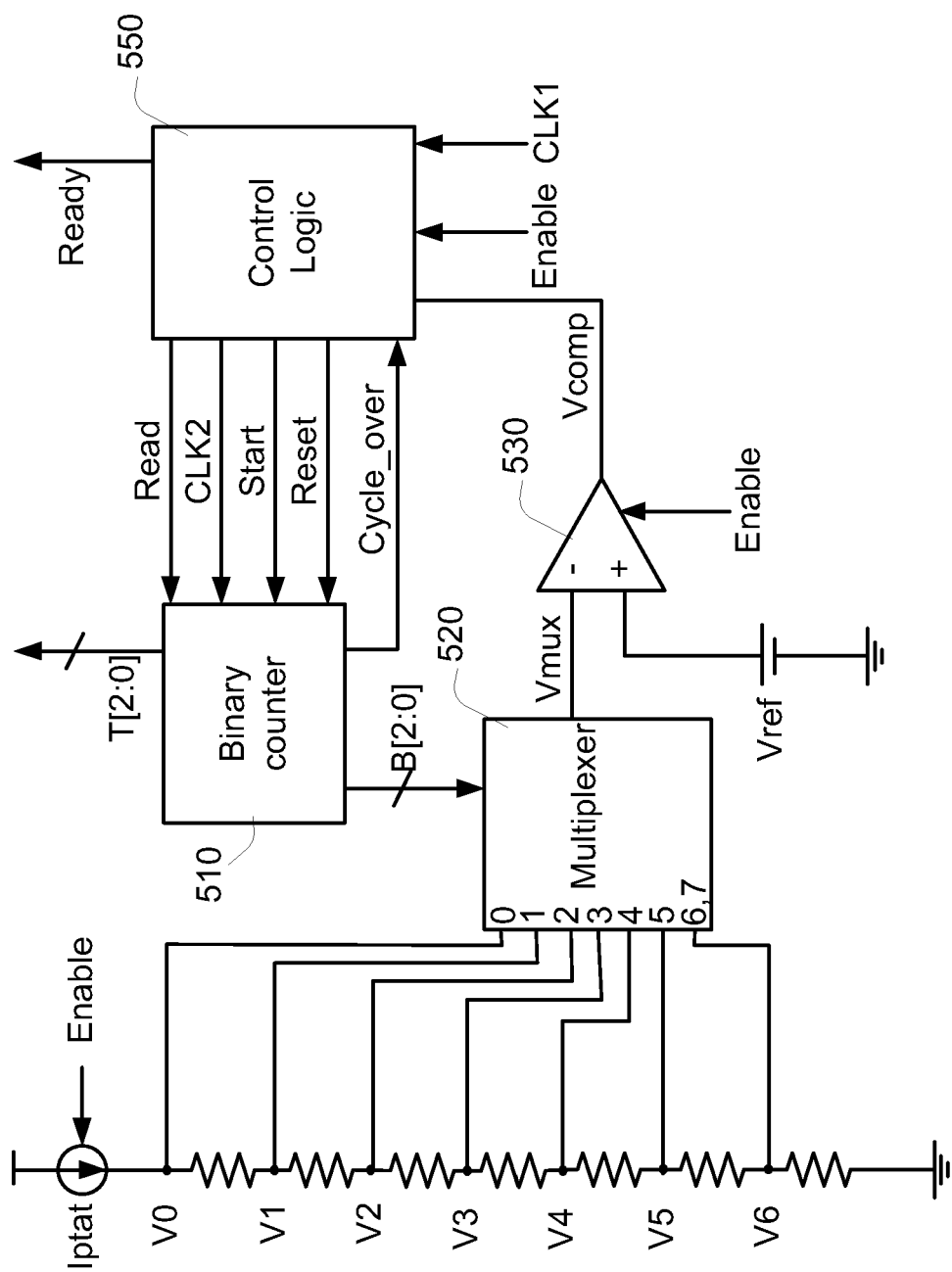
FIG. 5 is a schematic circuit diagram illustrating an exemplary temperature detecting device of the present invention, in which m=7 and n=2.

FIG. 5 is a schematic circuit diagram illustrating an exemplary temperature detecting device of the present invention, in which m=7 and n=2. As shown in FIG. 5, seven resistors are interconnected between a current source and a ground terminal in series. The current source outputs a PTAT (proportional to absolute temperature) current Iptat. The seven nodes between the current source and these resistors respectively provide seven voltage signals V0, V1, . . . , V5 and V6 to a multiplexer 520. The magnitudes of the voltage signals V0, V1, . . . , V5 and V6 have a descending order.

When an enable signal (Enable) is received by the temperature detecting device, the control logic 550 issues a start signal (Start) to the binary counter 510 to start a detecting cycle τ. During the detecting cycle τ, the binary counter 510 sequentially counts from 0 to 7 in response to a second clock signal (CLK2), and correspondingly produces a 3-bit binary select signal B [2:0] to the multiplexer 520. In response to the binary select signal B [2:0], one of the seven voltage signals is outputted from the multiplexer 520 as a multiplexer output signal (Vmux). The multiplexer output signal (Vmux) is transmitted to a negative input terminal of a comparator 530. A reference voltage (Vref) is inputted into a positive input terminal of the comparator 530. The multiplexer output signal (Vmux) is compared with the reference voltage (Vref), and thus a comparing signal (Vcomp) is outputted from the comparator 530 to the control logic 550.

If the comparing signal (Vcomp) has a level change, the control logic 550 issues a read signal (Read) to the binary counter 510. In response to the read signal (Read), the binary counter 510 is controlled to latch the current binary select signal B [2:0] as a counting value.

At a count of 7, the binary counter 510 also issues a cycle-over signal (Cycle_over) to the control logic 550. In response to the cycle-over signal (Cycle_over), the control logic 550 issues a reset signal (Reset) to the binary counter 510 to complete the detecting cycle.

After the detecting cycle is completed, the 3-bit binary select signal B [2:0] outputted from the binary counter 510 indicates the detected temperature range. In other words, the binary temperature signal is the counting value that is latched by the binary counter 510.

FIG. 6A is a schematic diagram illustrating the relationship between the PTAT (proportional to absolute temperature) current and the temperature in the temperature detecting device of FIG. 5. FIG. 6B is a schematic diagram illustrating the relationship between the seven voltage signals, the reference voltage and the temperature in the temperature detecting device of FIG. 5. As shown in FIG. 6A, the PTAT current Iptat increases with increasing temperature. Since the current Iptat varies with temperature and the current Iptat flows through the seven serially-connected resistors, the seven voltage signals V0, V1, ..., V5 and V6 also vary with temperature.

Please refer to FIG. 6B. In a case that the temperature is lower than T0, all of the seven voltage signals V0~V6 are lower than the reference voltage (Vref). In a case that the temperature ranges between T0 and T1, the voltage signal V0 is higher than the reference voltage (Vref) and the voltage signals V1~V6 are lower than the reference voltage (Vref). In a case that the temperature ranges between T1 and T2, the voltage signals V0~V1 are higher than the reference voltage (Vref) and the voltage signals V2~V6 are lower than the reference voltage (Vref). In a case that the temperature ranges between T2 and T3, the voltage signals V0~V2 are higher than the reference voltage (Vref) and the voltage signals V3~V6 are lower than the reference voltage (Vref). In a case that the temperature ranges between T3 and T4, the voltage signals V0~V3 are higher than the reference voltage (Vref) and the voltage signals V4~V6 are lower than the reference voltage (Vref). In a case that the temperature ranges between T4 and T5, the voltage signals V0~V4 are higher than the reference voltage (Vref) and the voltage signals V5~V6 are lower than the reference voltage (Vref). In a case that the temperature ranges between T5 and T6, the voltage signals V0~V5 are higher than the reference voltage (Vref) and the voltage signal V6 is lower than the reference voltage (Vref). In a case that the temperature is higher than T6, all of the seven voltage signals V0~V6 are higher than the reference voltage (Vref).

From the above description, the temperature detecting device of the present invention utilizes the binary counter 510 to output the binary select signal B [2:0] to the multiplexer 520. In response to the binary select signal B [2:0], the seven voltage signals are sequentially outputted from the multiplexer 520 to the comparator 530. The multiplexer output signal (Vmux) is compared with the reference voltage (Vref) by the comparator 530, and thus a comparing signal (Vcomp) is outputted from the comparator 530 to the control logic 550. If the comparing signal (Vcomp) has a level change, the temperature range is determined according to the binary select signal B[2:0].

Figure 7A:
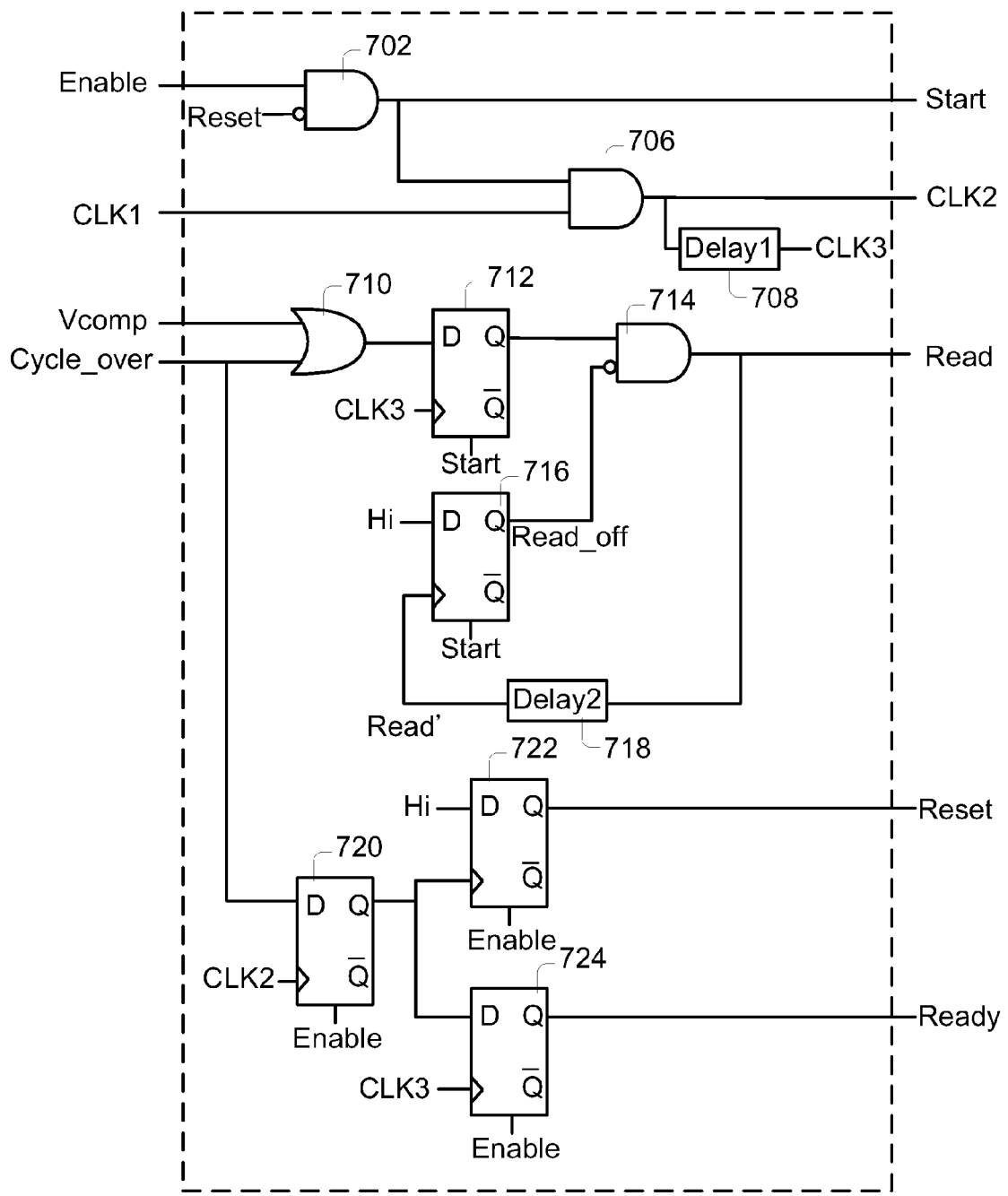
FIG. 7A is a schematic circuit diagram illustrating a first exemplary control logic used in the temperature detecting device of the present invention.

FIG. 7A is a schematic circuit diagram illustrating a first exemplary control logic used in the temperature detecting device of the present invention.

As shown in FIG. 7A, a first AND gate 702 has a first input terminal for receiving an enable signal (Enable), a second input terminal for receiving an inversed reset signal (Reset), and an output terminal for outputting a start signal (Start). A second AND gate 706 has a first input terminal for receiving the start signal (Start), a second input terminal for receiving a first clock signal (CLK1), and an output terminal for outputting a second clock signal (CLK2). The second clock signal (CLK2) is delayed for a first delaying time (Delay1) by a first delaying unit 708, thereby outputting a third clock signal (CLK3).

In addition, an OR gate 710 has a first input terminal for receiving the comparing signal (Vcomp), and a second input terminal for receiving the cycle-over signal (Cycle_over). A first D flip-flop 712 is controlled by the start signal (Start). The data input terminal (D) of the first D flip-flop 712 is connected to the output terminal of the OR gate 710. The third clock signal (CLK3) is inputted into the clock input terminal of the first D flip-flop 712. A third AND gate 714 has a first input terminal connected to the data output terminal (Q) of the first D flip-flop 712, and an output terminal for outputting the read signal (Read).

The read signal (Read) is delayed for a second delaying time (Delay2) by a second delaying unit 718, thereby outputting a delayed read signal (Read'). A second D flip-flop 716 is controlled by the start signal (Start). A high-level signal (Hi) is inputted into the data input terminal (D) of the second D flip-flop 716. The delayed read signal (Read') is inputted into the clock input terminal of the second D flip-flop 716. A read off signal (Read_off) is outputted from the data output terminal (Q) of the second D flip-flop 716. The inversed read off signal (Read_off) is transmitted to the second input terminal of the third AND gate 714.

A third D flip-flop 720 is controlled by the enable signal (Enable). The cycle-over signal (Cycle_over) is inputted into the data input terminal (D) of the third D flip-flop 720. The second clock signal (CLK2) is inputted into the clock input terminal of the third D flip-flop 720. A fourth D flip-flop 722 is controlled by the enable signal (Enable). A high-level signal (Hi) is inputted into the data input terminal (D) of the fourth D flip-flop 722. The clock input terminal of the fourth D flip-flop 722 is connected to the data output terminal (Q) of the third D flip-flop 720. A reset signal (Reset) is outputted from the data output terminal (Q) of the fourth D flip-flop 722. A fifth D flip-flop 724 is controlled by the enable signal (Enable). The data input terminal (D) of the fifth D flip-flop 724 is connected to the data output terminal (Q) of the third D flip-flop 720. The third clock signal (CLK3) is inputted into the clock input terminal of the fifth D flip-flop 724. A ready signal (Ready) is outputted from the data output terminal (Q) of the fifth D flip-flop 724. Moreover, the sum of the first delaying time (Delay1) and the second delaying time (Delay2) is smaller than a cycle of the second clock signal (CLK2).

Figure 7B:
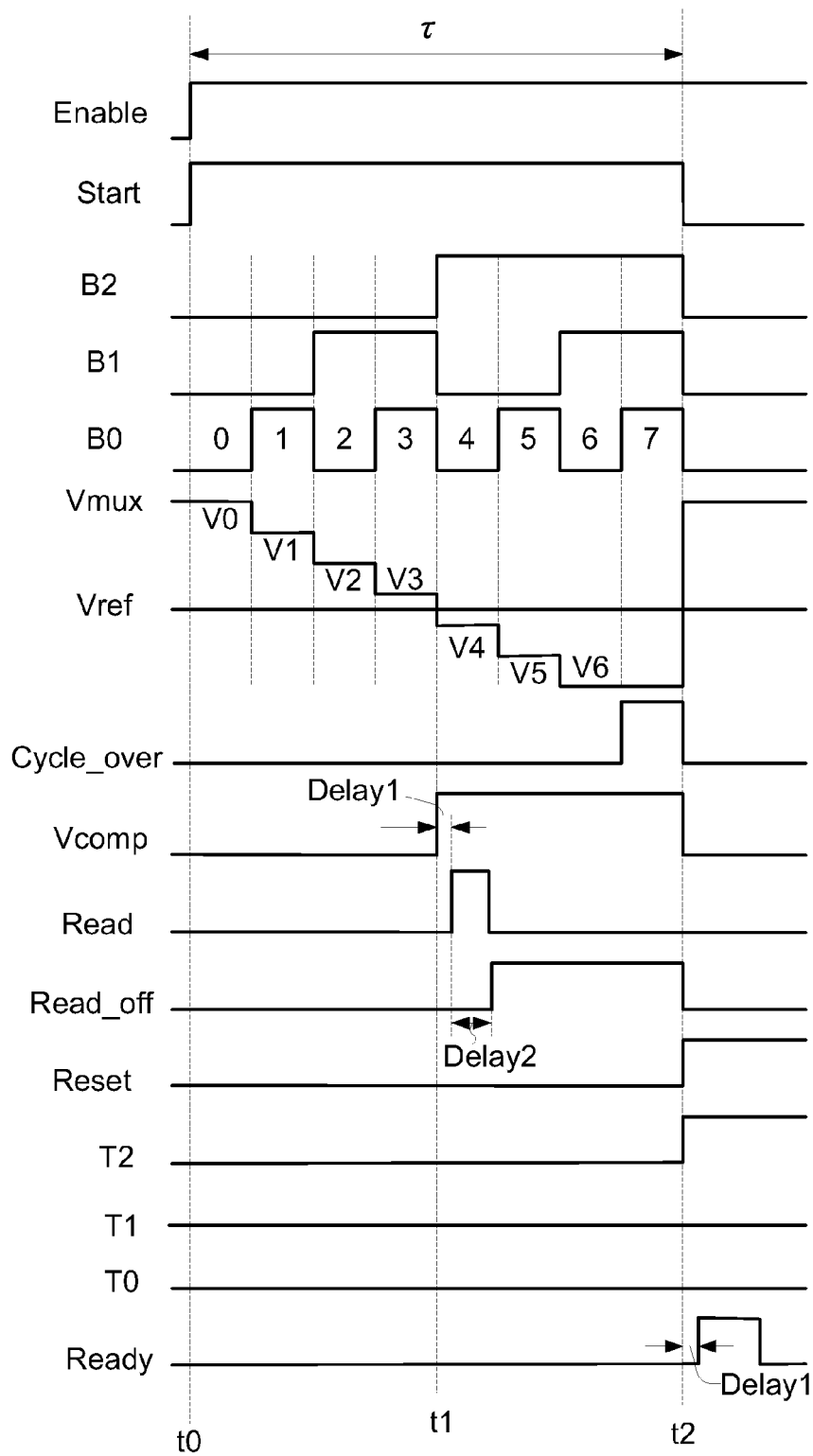
FIG. 7B is a schematic timing waveform diagram illustrating associated signals processed in the temperature detecting device having the control logic of FIG. 7A, in which the temperature is within the detecting range (T0~T6)

FIG. 7B is a schematic timing waveform diagram illustrating associated signals processed in the temperature detecting device having the control logic of FIG. 7A, in which the temperature is within the detecting range (T0~T6).

At the time spot t0, the enable signal (Enable) and the start signal (Start) are switched from low-level states to high-level states. Meanwhile, the detecting cycle τ starts.

During the detecting cycle τ, the binary counter 510 sequentially counts from 0 to 7 in response to a second clock signal (CLK2), and correspondingly produces a 3-bit binary select signal B[2:0] to the multiplexer 520. In response to the binary select signal B[2:0], the seven voltage signals V0~V6 are sequentially outputted from the multiplexer 520 to the comparator 530 as the multiplexer output signal (Vmux).

Before the time spot t1, the multiplexer output signal (Vmux) is higher than the reference voltage (Vref), and thus the comparing signal (Vcomp) outputted from the comparator 530 is at a low-level state. At the time spot t1, the counting value of the binary counter 510 is 4. Meanwhile, the multiplexer output signal (Vmux) becomes lower than the reference voltage (Vref), and thus the comparing signal (Vcomp) outputted from the comparator 530 is switched from the low-level state to a high-level state.

After the comparing signal (Vcomp) has been at the high-level state for the first delaying time (Delay1), the read signal (Read) is switched from the low-level state to the high-level state, so that the counting value 4 is latched by the binary counter 510. After the read signal (Read) has been switched to the high-level state for the second delaying time (Delay2), the read signal (Read) is restored to the low-level state.

At a count of the latest value 7, the binary counter 510 issues a cycle-over signal (Cycle_over) to the control logic 550. At the time spot t2, the control logic 550 issues a reset signal (Reset) to the binary counter 510, and the start signal (Start) is switched from the high-level state to the low-level state. Meanwhile, the detecting cycle τ is completed.

After the detecting cycle τ is completed, the binary counter 510 generates a 3-bit binary temperature signal T[2:0] having a counting value of 4. After the detecting cycle τ has completed for the first delaying time (Delay1), the control logic 550 issues a ready signal (Ready) for notifying other circuits (not shown). Meanwhile, the 3-bit binary temperature signal T[2:0] is "100", which corresponds to a counting value of 4. In other words, the temperature is ranged between T3 and T4.

Figure 7C:
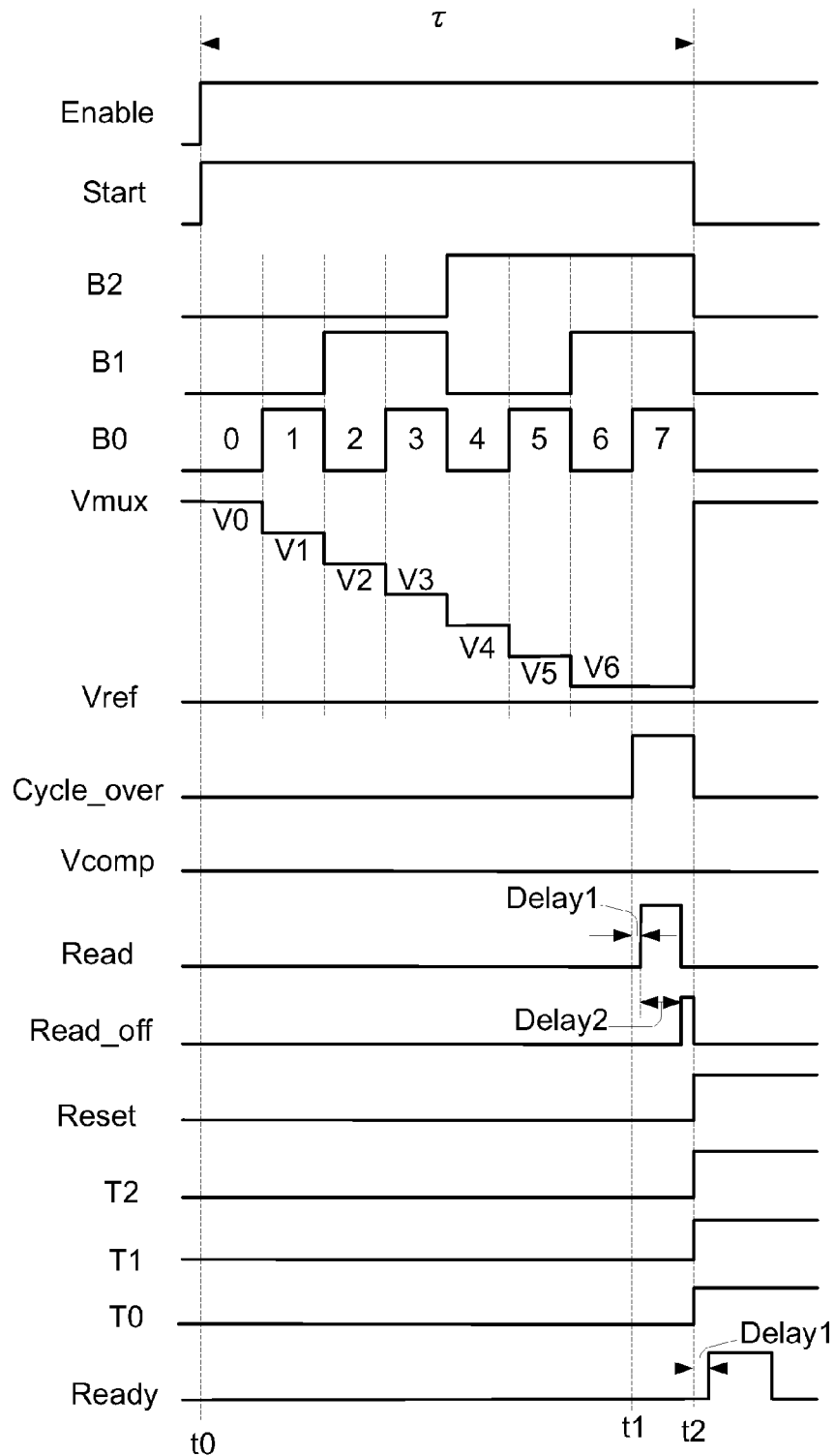
FIG. 7C is a schematic timing waveform diagram illustrating associated signals processed in the temperature detecting device having the control logic of FIG. 7A, in which the temperature exceeds the detecting range (T0~T6)

FIG. 7C is a schematic timing waveform diagram illustrating associated signals processed in the temperature detecting device having the control logic of FIG. 7A, in which the temperature exceeds the detecting range (T0~T6).

At the time spot t0, the enable signal (Enable) and the start signal (Start) are switched from low-level states to high-level states. Meanwhile, the detecting cycle τ starts.

During the detecting cycle τ, the binary counter 510 sequentially counts from 0 to 7 in response to a second clock signal (CLK2), and correspondingly produces a 3-bit binary select signal B[2:0] to the multiplexer 520. In response to the binary select signal B[2:0], the seven voltage signals V0~V6 are sequentially outputted from the multiplexer 520 to the comparator 530 as the multiplexer output signal (Vmux).

Before the time spot t1, the counting value of the binary counter 510 is 6. The multiplexer output signal (Vmux) is still higher than the reference voltage (Vref), and thus the comparing signal (Vcomp) outputted from the comparator 530 is maintained at the low-level state.

At the time spot t1, the binary counter 510 has a count of the latest value 7, and the binary counter 510 issues a cycle-over signal (Cycle_over) to the control logic 550. After the cycle-over signal (Cycle_over) has been issued for the first delaying time (Delay1), the read signal (Read) is switched from the low-level state to the high-level state, so that the counting value 7 is latched by the binary counter 510. After the read signal (Read) has been switched to the high-level state for the second delaying time (Delay2), the read signal (Read) is restored to the low-level state.

After the detecting cycle τ is completed, the control logic 550 issues a reset signal (Reset) to the binary counter 510 at the time spot t2. Meanwhile, the start signal (Start) is switched from the high-level state to the low-level state. Thus, the detecting cycle τ is completed.

Since the counting value 7 is latched by the binary counter 510, the 3-bit binary temperature signal T[2:0] is "111". After the detecting cycle τ has been completed for the first delaying time (Delay1), the control logic 550 issues a ready signal (Ready) for notifying other circuits (not shown). The temperature range could be determined according to the 3-bit binary temperature signal T[2:0]. The 3-bit binary temperature signal T[2:0] corresponds to a counting value 7. In other words, the temperature is higher than T6.

Figure 8A:
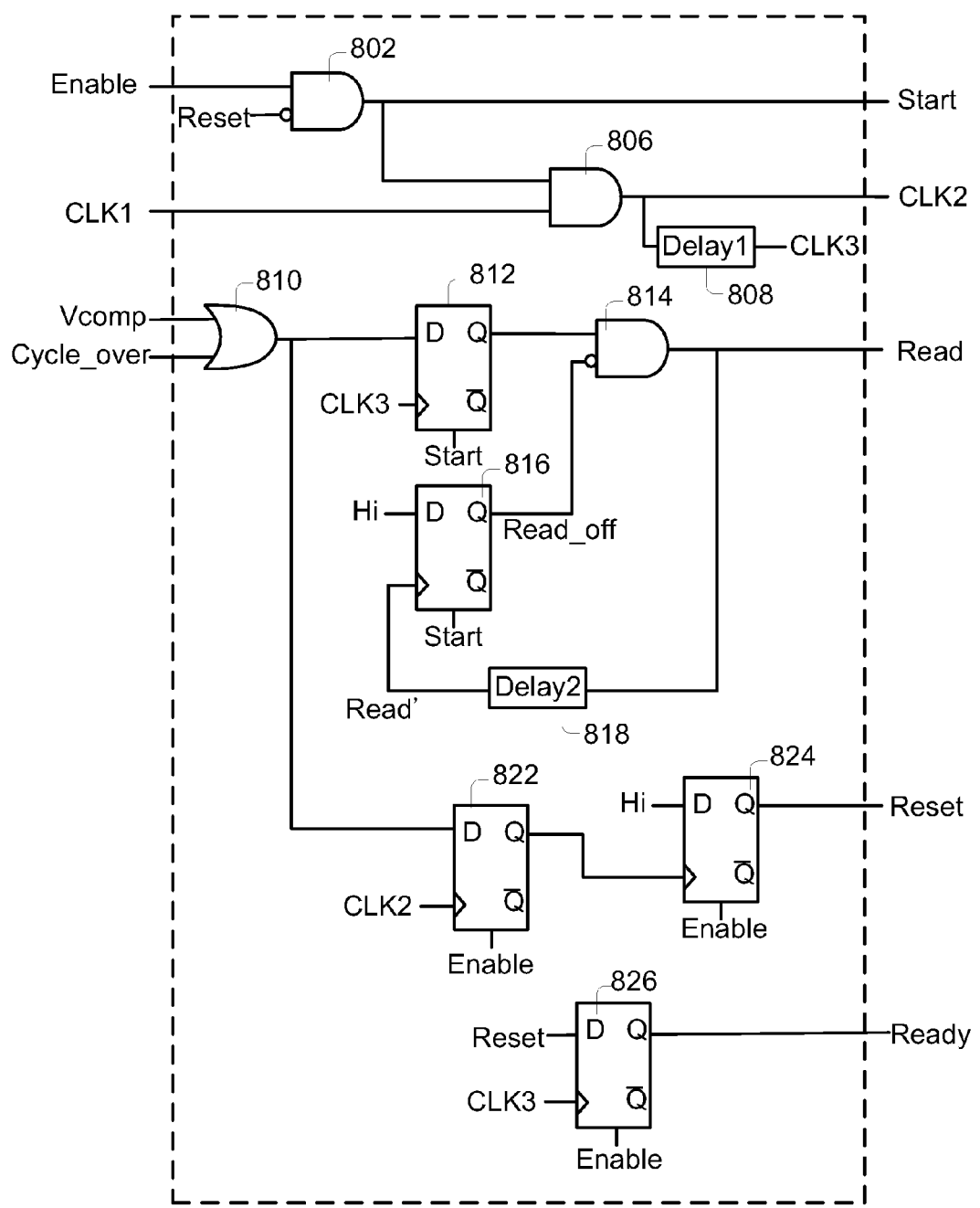
FIG. 8A is a schematic circuit diagram illustrating a second exemplary control logic used in the temperature detecting device of the present invention.

FIG. 8A is a schematic circuit diagram illustrating a second exemplary control logic used in the temperature detecting device of the present invention.

As shown in FIG. 8A, a first AND gate 802 has a first input terminal for receiving an enable signal (Enable), a second input terminal for receiving an inversed reset signal (Reset), and an output terminal for outputting a start signal (Start). A second AND gate 806 has a first input terminal for receiving the start signal (Start), a second input terminal for receiving a first clock signal (CLK1), and an output terminal for outputting a second clock signal (CLK2). The second clock signal (CLK2) is delayed for a first delaying time (Delay1) by a first delaying unit 808, thereby outputting a third clock signal (CLK3).

In addition, an OR gate 810 has a first input terminal for receiving the comparing signal (Vcomp), and a second input terminal for receiving the cycle-over signal (Cycle_over). A first D flip-flop 812 is controlled by the start signal (Start). The data input terminal (D) of the first D flip-flop 812 is connected to the output terminal of the OR gate 810. The third clock signal (CLK3) is inputted into the clock input terminal of the first D flip-flop 812. A third AND gate 814 has a first input terminal connected to the data output terminal (Q) of the first D flip-flop 812, and an output terminal for outputting the read signal (Read).

The read signal (Read) is delayed for a second delaying time (Delay2) by a second delaying unit 818, thereby outputting a delayed read signal (Read'). A second D flip-flop 816 is controlled by the start signal (Start). A high-level signal (Hi) is inputted into the data input terminal (D) of the second D flip-flop 816. The delayed read signal (Read') is inputted into the clock input terminal of the second D flip-flop 816. A read off signal (Read_off) is outputted from the data output terminal (Q) of the second D flip-flop 816. The inversed read off signal (Read_off) is transmitted to the second input terminal of the third AND gate 814.

A third D flip-flop 822 is controlled by the enable signal (Enable). The data input terminal (D) of the third D flip-flop 822 is connected to the output terminal of the OR gate 810. The second clock signal (CLK2) is inputted into the clock input terminal of the third D flip-flop 822. A fourth D flip-flop 824 is controlled by the enable signal (Enable). A high-level signal (Hi) is inputted into the data input terminal (D) of the fourth D flip-flop 824. The clock input terminal of the fourth D flip-flop 824 is connected to the data output terminal (Q) of the third D flip-flop 822. A reset signal (Reset) is outputted from the data output terminal (Q) of the fourth D flip-flop 824. A fifth D flip-flop 826 is controlled by the enable signal (Enable). The reset signal (Reset) is inputted into the data input terminal (D) of the fifth D flip-flop 826. The third clock signal (CLK3) is inputted into the clock input terminal of the fifth D flip-flop 826. A ready signal (Ready) is outputted from the data output terminal (Q) of the fifth D flip-flop 826.

Figure 8B:
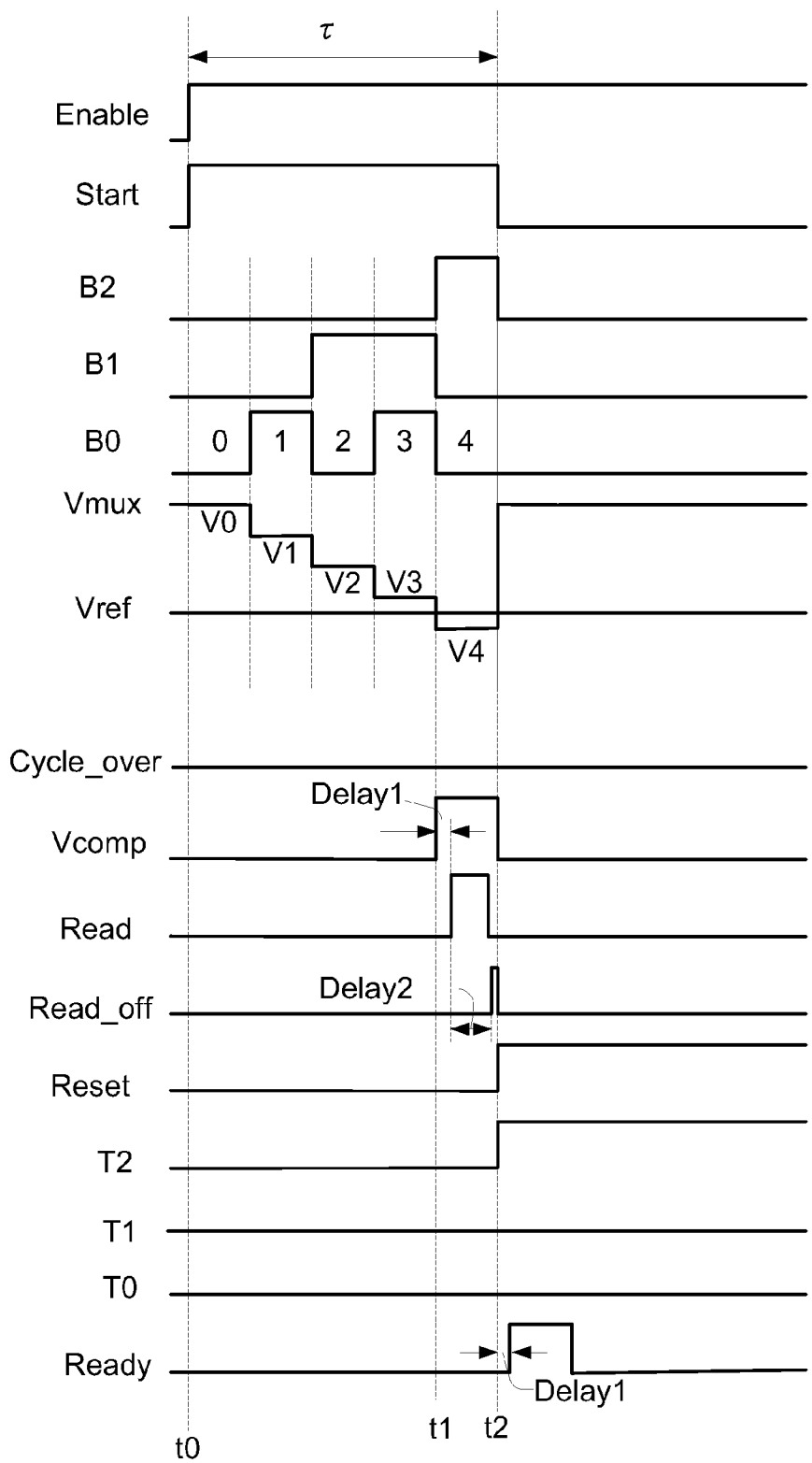
FIG. 8B is a schematic timing waveform diagram illustrating associated signals processed in the temperature detecting device having the control logic of FIG. 8A.

FIG. 8B is a schematic timing waveform diagram illustrating associated signals processed in the temperature detecting device having the control logic of FIG. 8A, in which the detecting cycle is completed when the temperature range is detected.

At the time spot t0, the enable signal (Enable) and the start signal (Start) are switched from low-level states to high-level states. Meanwhile, the detecting cycle τ starts.

During the detecting cycle τ, the binary counter 510 up-counts from 0 in response to the second clock signal (CLK2), and correspondingly produces a 3-bit binary select signal B[2:0] to the multiplexer 520. In response to the binary select signal B [2:0], the voltage signals V0~V4 are sequentially outputted from the multiplexer 520 to the comparator 530 as the multiplexer output signal (Vmux).

Before the time spot t1, the multiplexer output signal (Vmux) is higher than the reference voltage (Vref), and thus the comparing signal (Vcomp) outputted from the comparator 530 is at a low-level state. At the time spot t1, the counting value of the binary counter 510 is 4. Meanwhile, the multiplexer output signal (Vmux) is lower than the reference voltage (Vref), and thus the comparing signal (Vcomp) outputted from the comparator 530 is switched from the low-level state to a high-level state.

After the comparing signal (Vcomp) has been switched to the high-level state for the first delaying time (Delay1), the read signal (Read) is switched from the low-level state to the high-level state, so that the counting value 4 is latched by the binary counter 510. After the read signal (Read) has been switched to the high-level state for the second delaying time (Delay2), the read signal (Read) is restored to the low-level state.

At the time spot t2 (i.e. a cycle of the second clock signal (CLK2) after the time spot t1), the control logic 550 issues a reset signal (Reset) to the binary counter 510, and the start signal (Start) is switched from the high-level state to the low-level state. Meanwhile, the detecting cycle τ is completed.

After the detecting cycle τ is completed, the binary counter 510 generates a 3-bit binary temperature signal T[2:0] having a counting value of 4. After the detecting cycle τ has been completed for the first delaying time (Delay1), the control logic 550 issues a ready signal (Ready) for notifying other circuits (not shown). Meanwhile, the 3-bit binary temperature signal T[2:0] is "100", which corresponds to a counting value of 4. In other words, the temperature ranges between T3 and T4.

Figure 9A:
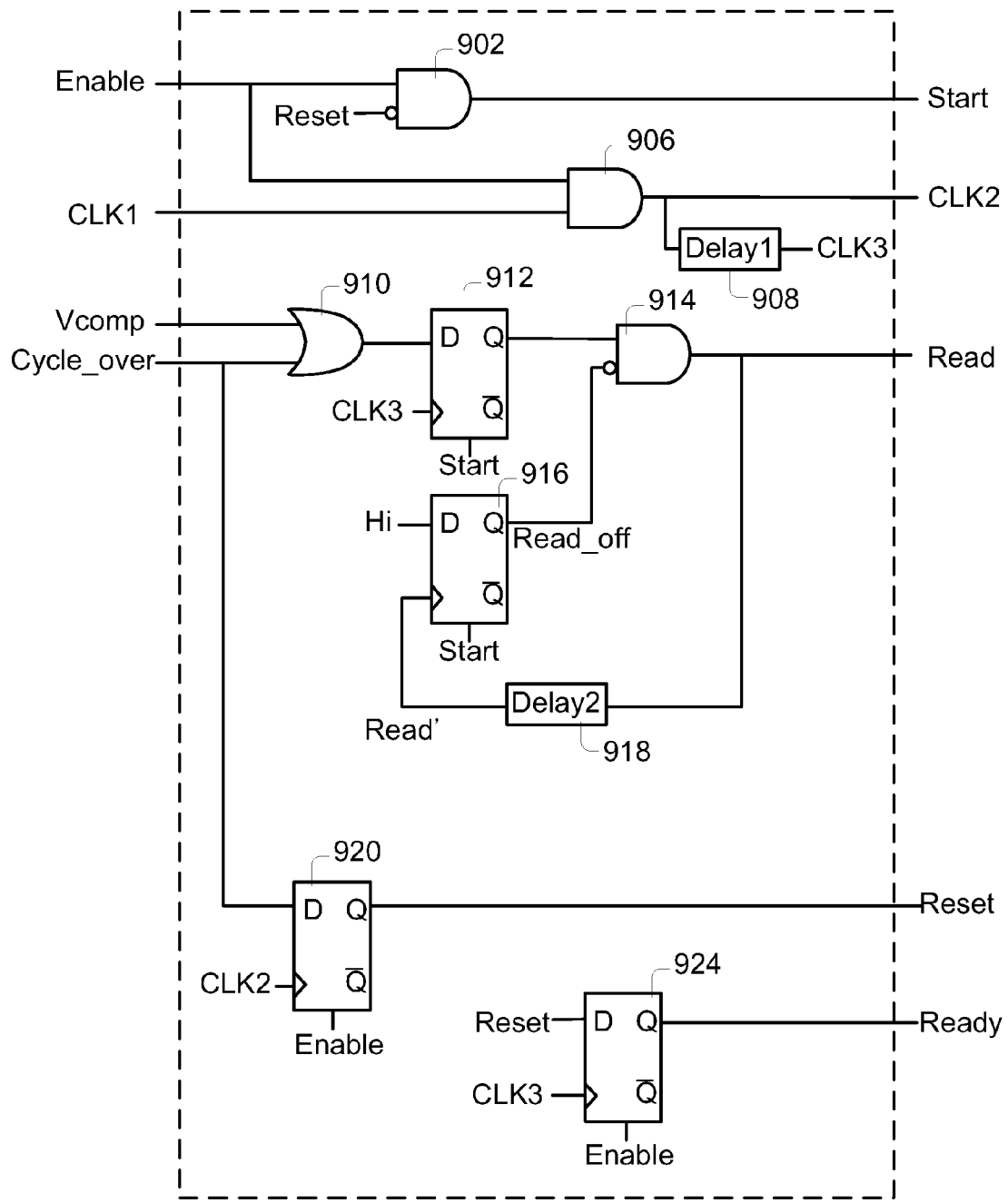
FIG. 9A is a schematic circuit diagram illustrating a third exemplary control logic used in the temperature detecting device of the present invention.

FIG. 9A is a schematic circuit diagram illustrating a third exemplary control logic used in the temperature detecting device of the present invention.

As shown in FIG. 9A, a first AND gate 902 has a first input terminal for receiving an enable signal (Enable), a second input terminal for receiving an inversed reset signal (Reset), and an output terminal for outputting a start signal (Start). A second AND gate 906 has a first input terminal for receiving the start signal (Start), a second input terminal for receiving a first clock signal (CLK1), and an output terminal for outputting a second clock signal (CLK2). The second clock signal (CLK2) is delayed for a first delaying time (Delay1) by a first delaying unit 908, thereby outputting a third clock signal (CLK3).

In addition, an OR gate 910 has a first input terminal for receiving the comparing signal (Vcomp), and a second input terminal for receiving the cycle-over signal (Cycle_over). A first D flip-flop 912 is controlled by the start signal (Start). The data input terminal (D) of the first D flip-flop 912 is connected to the output terminal of the OR gate 910. The third clock signal (CLK3) is inputted into the clock input terminal of the first D flip-flop 912. A third AND gate 914 has a first input terminal connected to the data output terminal (Q) of the first D flip-flop 912, and an output terminal for outputting the read signal (Read).

The read signal (Read) is delayed for a second delaying time (Delay2) by a second delaying unit 918, thereby outputting a delayed read signal (Read'). A second D flip-flop 916 is controlled by the start signal (Start). A high-level signal (Hi) is inputted into the data input terminal (D) of the second D flip-flop 916. The delayed read signal (Read') is inputted into the clock input terminal of the second D flip-flop 916. A read off signal (Read_off) is outputted from the data output terminal (Q) of the second D flip-flop 916. The inversed read off signal (Read_off) is transmitted to the second input terminal of the third AND gate 914.

A third D flip-flop 920 is controlled by the enable signal (Enable). The cycle-over signal (Cycle_over) is inputted into the data input terminal (D) of the third D flip-flop 920. The second clock signal (CLK2) is inputted into the clock input terminal of the third D flip-flop 920. A reset signal (Reset) is outputted from the data output terminal (Q) of the third D flip-flop 920. A fourth D flip-flop 924 is controlled by the enable signal (Enable). A reset signal (Reset) is inputted into the data input terminal (D) of the fourth D flip-flop 924. The third clock signal (CLK3) is inputted into the clock input terminal of the fourth D flip-flop 924. A ready signal (Ready) is outputted from the data output terminal (Q) of the fourth D flip-flop 924.

Figure 9B:
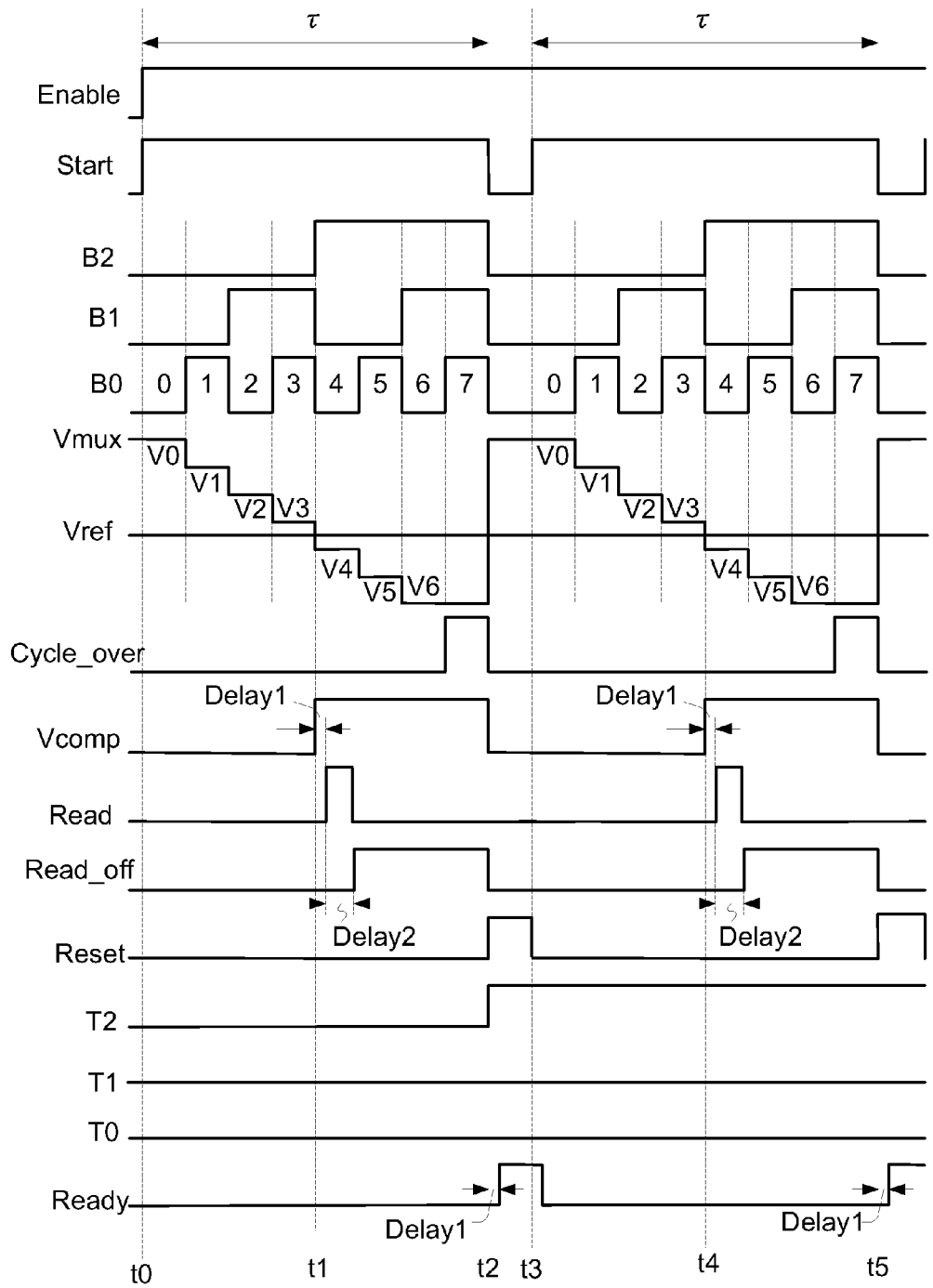
FIG. 9B is a schematic timing waveform diagram illustrating associated signals processed in the temperature detecting device having the control logic of FIG. 9A.

FIG. 9B is a schematic timing waveform diagram illustrating associated signals processed in the temperature detecting device having the control logic of FIG. 9A. In this embodiment, the detecting cycle is continuously generated.

At the time spot t0, the enable signal (Enable) and the start signal (Start) are switched from low-level states to high-level states. Meanwhile, the detecting cycle τ starts.

During the detecting cycle τ, the binary counter 510 sequentially counts from 0 to 7 in response to a second clock signal (CLK2), and correspondingly produces a 3-bit binary select signal B[2:0] to the multiplexer 520. In response to the binary select signal B[2:0], the seven voltage signals V0~V6 are sequentially outputted from the multiplexer 520 to the comparator 530 as the multiplexer output signal (Vmux).

Before the time spot t1, the multiplexer output signal (Vmux) is higher than the reference voltage (Vref), and thus the comparing signal (Vcomp) outputted from the comparator 530 is at a low-level state. At the time spot t1, the counting value of the binary counter 510 is 4. Meanwhile, the multiplexer output signal (Vmux) is lower than the reference voltage (Vref), and thus the comparing signal (Vcomp) outputted from the comparator 530 is switched from the low-level state to a high-level state.

After the comparing signal (Vcomp) has been switched to the high-level state for the first delaying time (Delay1), the read signal (Read) is switched from the low-level state to the high-level state, so that the counting value 4 is latched by the binary counter 510. After the read signal (Read) has been switched to the high-level state for the second delaying time (Delay2), the read signal (Read) is restored to the low-level state.

At a count of the latest value 7, the binary counter 510 issues a cycle-over signal (Cycle_over) to the control logic 550. At the time spot t2, the control logic 550 issues a reset signal (Reset) to the binary counter 510, and the start signal (Start) is switched from the high-level state to the low-level state. Meanwhile, the detecting cycle τ is completed.

After the detecting cycle τ is completed, the binary counter 510 generates a 3-bit binary temperature signal T[2:0] having a counting value of 4. After the detecting cycle τ has been completed for the first delaying time (Delay1), the control logic 550 issues a ready signal (Ready) for notifying other circuits (not shown). Meanwhile, the 3-bit binary temperature signal T[2:0] is "100", which corresponds to a counting value of 4. In other words, the temperature ranges between T3 and T4.

At the time spot t3 (i.e. a cycle of the second clock signal (CLK2) after the reset signal (Reset) is issued at the time spot t2), the reset signal (Reset) is switched from the high-level state to the low-level state. Meanwhile, the start signal (Start) is switched from the low-level state to the high-level state, so that a next detecting cycle τ starts.

At the time spot t4, the comparing signal (Vcomp) is switched from the low-level state to a high-level state. At the time spot t5, the detecting cycle τ is completed.

From the above description, the temperature detecting device uses a binary counter to sequentially produce binary select signals to the multiplexer during the detecting cycle. As such, a plurality of voltage signals are sequentially outputted from the multiplexer to the comparator as the multiplexer output signal (Vmux). If the comparing signal (Vcomp) has a level change, the temperature range could be realized according to the binary select signal outputted from the binary counter.

For stabilizing the comparing signal (Vcomp), the comparator is preferably a hysteresis comparator for comparing the multiplexer output signal (Vmux) with the reference voltage (Vref). The hysteresis comparator can provide more stable comparing signal (Vcomp).

From the above description, the present invention provides a temperature detecting device and a temperature detecting method. By using a single comparator, the temperature detecting device can directly output a binary temperature signal. In other words, since no additional encoder is required for conversion, the layout area of the temperature detecting device is largely reduced.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A temperature detecting device, comprising:
   a current source, for providing a proportional to absolute temperature (PTAT) current;
   a plurality of resistors, connected between the current source and a ground terminal in series, for providing m voltage signals with ascending or descending voltages;
   a binary counter, for counting in response to a start signal, thereby generating a binary select signal, wherein the binary select signal has (n+1) bits;
   a multiplexer, having m input terminals, for respectively receiving the m voltage signals, and outputting a multiplexer output signal selected from one of the m voltage signals according to the binary select signal, wherein $2^n < m < 2^{n+1}$;
   a comparator, for comparing the multiplexer output signal with a reference voltage, thereby generating a comparing signal, wherein the reference voltage does not vary with temperature; and
   a control logic, for issuing the start signal, and when the comparing signal has a level change, the control logic controls the binary counter to record the binary select signal as a binary temperature signal.

2. The temperature detecting device according to claim 1, wherein the binary counter is a binary up counter or a binary down counter.

3. The temperature detecting device according to claim 1, wherein when the comparing signal has the level change, the control logic issues a read signal to the binary counter, and the binary select signal is recorded in response to the read signal.

4. The temperature detecting device according to claim 1, wherein a detecting cycle starts when the start signal is issued by the control logic, wherein during the detecting cycle, the binary counter sequentially counts from 0 to m.

5. The temperature detecting device according to claim 4, wherein when the binary counter is at a count of m, the binary counter issues a cycle-over signal.

6. The temperature detecting device according to claim 5, wherein in response to the cycle-over signal, the control logic issues a reset signal to the binary counter, thereby generating a ready signal.

7. The temperature detecting device according to claim 1, wherein a detecting cycle starts when the start signal is issued by the control logic, and the detecting cycle ends when the control logic controls the binary counter to record the binary select signal.

8. The temperature detecting device according to claim 7, wherein when the detecting cycle ends, the control logic issues a reset signal to the binary counter, thereby generating a ready signal.

9. The temperature detecting device according to claim 1, wherein the comparator is a hysteresis comparator.

10. A temperature detecting method used with a temperature detecting device comprising a single comparator, the temperature detecting method comprising steps of:
    allowing a proportional to absolute temperature (PTAT) current to flow through a plurality of resistors with serial connection, thereby sequentially generating m voltages signals with ascending or descending voltages; and
    sequentially inputting the m voltage signals into the single comparator during a detecting cycle, and comparing the m voltage signals with a reference voltage, thereby generating a comparing signal, wherein the reference voltage does not vary with temperature; and
    when the comparing signal corresponding to the kth voltage signal of the m voltage signals is switched from a first level state to a second level state, a specified temperature is determined according to a binary temperature signal, wherein the comparing signals corresponding to the first (k−1) voltage signals of the m voltage signals are all at the first level state.

11. The temperature detecting method according to claim 10, wherein the m voltage signals are received by a multiplexer, and a binary counter generates a binary select signal to control the multiplexer, thereby sequentially inputting the m voltage signals into the comparator.

12. The temperature detecting method according to claim 11, wherein the binary counter is a binary up counter or a binary down counter.

13. The temperature detecting method according to claim 11, wherein the binary select signal has (n+1) bits, and $2^n < m < 2^{n+1}$.

* * * * *